United States Patent
Hamano

(10) Patent No.: US 11,414,831 B2
(45) Date of Patent: Aug. 16, 2022

(54) LIFTING AND LOWERING DEVICE FOR CONSTRUCTION MACHINE

(71) Applicant: Hitachi Construction Machinery Co., Ltd., Tokyo (JP)

(72) Inventor: Hiroki Hamano, Tsuchiura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 570 days.

(21) Appl. No.: 16/492,383

(22) PCT Filed: Jun. 20, 2018

(86) PCT No.: PCT/JP2018/023378
§ 371 (c)(1),
(2) Date: Sep. 9, 2019

(87) PCT Pub. No.: WO2019/012928
PCT Pub. Date: Jan. 17, 2019

(65) Prior Publication Data
US 2021/0140141 A1    May 13, 2021

(30) Foreign Application Priority Data
Jul. 11, 2017  (JP) ............. JP2017-135528

(51) Int. Cl.
*B60R 3/02* (2006.01)
*E06C 5/06* (2006.01)
*E02F 9/08* (2006.01)

(52) U.S. Cl.
CPC ............. *E02F 9/0833* (2013.01); *B60R 3/02* (2013.01); *E06C 5/06* (2013.01)

(58) Field of Classification Search
CPC ......... E02F 9/0833; B60R 3/02; B60R 3/007; B60R 3/005; E06C 5/06; E06C 5/04; E06C 5/02
See application file for complete search history.

(56) References Cited

U.S. PATENT DOCUMENTS 6,986,402 B2 * 1/2006 Hedley ............... B60R 3/02
                                                182/95
9,669,765 B2 * 6/2017 Vernickel ............. B60R 3/02
(Continued)

FOREIGN PATENT DOCUMENTS

CN      102518391 A    6/2012
JP      2005-83033 A   3/2005
(Continued)

OTHER PUBLICATIONS

Chinese-language Office Action issued in Chinese Application No. 201880015934.9 dated Jan. 27, 2021 (6 pages).
(Continued)

*Primary Examiner* — John D Walters
(74) *Attorney, Agent, or Firm* — Crowell & Moring LLP

(57) ABSTRACT

A pair of right and left supporting bases (10) provided on a sidewalk (9) of a revolving body (4) and both right and left sides (16) of a movable ladder (12) are connected by trajectory restricting members (22) in a swingable manner. In positions of the left supporting base (10) which are apart from each other, main body base ends (20a and 21a) of first and second hydraulic cylinders (20 and 21) are pivotally supported, and rod tip ends (20b and 21b) of the respective hydraulic cylinders (20 and 21) are pivotally supported in a common position of the left side (16) of the movable ladder (12). By operating the first and second hydraulic cylinders (20 and 21) in directions reverse to each other (extension and retraction), in-common pivotally supported parts (20b and 21b) are moved, thereby switching a position of the movable ladder (12) between an extended position and a retracted position.

5 Claims, 5 Drawing Sheets

(56) References Cited

U.S. PATENT DOCUMENTS

| | | | |
|---|---|---|---|
| 10,093,238 B2 * | 10/2018 | Koga | ............... B60R 3/00 |
| 10,494,792 B2 * | 12/2019 | Machida | ............... B60R 1/00 |
| 2005/0167196 A1 | 8/2005 | Hedley et al. | |
| 2015/0246642 A1 | 9/2015 | Vernickel et al. | |
| 2017/0190293 A1 | 7/2017 | Koga | |
| 2018/0080198 A1 | 3/2018 | Machida et al. | |

FOREIGN PATENT DOCUMENTS

| | | |
|---|---|---|
| JP | 2009-263876 A | 11/2009 |
| WO | WO 2016/174977 A1 | 11/2016 |
| WO | WO 2017/002160 A1 | 1/2017 |

OTHER PUBLICATIONS

International Search Report (PCT/ISA/210) issued in PCT Application No. PCT/JP2018/023378 dated Jul. 24, 2018 with English translation (five pages).

Japanese-language Written Opinion (PCT/ISA/237) issued in PCT Application No. PCT/JP2018/023378 dated Jul. 24, 2018 (three pages).

* cited by examiner

LIFTING AND LOWERING DEVICE FOR CONSTRUCTION MACHINE

TECHNICAL FIELD

The present invention relates to a lifting and lowering device used for a large-sized construction machine.

BACKGROUND ART

On a construction machine such as a hydraulic excavator and a loader shovel which are large-sized, a revolving body is attached via a revolving device on a traveling body, a cab is installed on the revolving body, and a multi-articulated front for excavation is attached. On such a large-sized construction machine, since the revolving body is located in a high place with respect to a height of an operator, the operator cannot ascend to and descend from the revolving body without using some lifting and lowering device.

Therefore, for example, a hydraulic excavator described in Patent Document 1 includes a lifting and lowering device constituted of a retractable ladder. A base end of the ladder is connected to a sidewalk on a revolving body, and the ladder is driven by a hydraulic cylinder and is thereby revolvable with the base end as a center. During operation of the hydraulic excavator, the ladder is held in a retracted position in such a way as to stand upright on the sidewalk. When an operator descents from a cab after finishing the operation, the ladder is driven by the hydraulic cylinder and is thereby revolved with the base end as the center in such a way as to fall down to a side of the hydraulic excavator, and a leading end thereof is located in the vicinity of a ground surface. Thus, the operator climbs down the ladder and can thereby descend to the ground surface, and also upon starting the operation next day, the operator climbs up the ladder and can thereby ascend to the revolving body.

On the other hand, instead of one-stage type ladder as with the lifting and lowering device in Patent Document 1, a lifting and lowering device constituted of a foldable two-stage type ladder has been put into practical use. In the above-mentioned conventional lifting and lowering device, a base end of a first ladder is revolvably connected to a sidewalk of a revolving body, and a base end of a second ladder is revolvably connected to a leading end of the first ladder. The first ladder is driven by a hydraulic cylinder and thereby is revolved between a retracted position and an extended position, and that movement is transmitted via a four-articulated link mechanism to the second ladder. With the first ladder in the retracted position, the second ladder is folded and superposed on the first ladder, and with the first ladder in the extended position, the second ladder is extended, and a leading end of the second ladder is located in the vicinity of a ground surface.

PRIOR ART DOCUMENT

Patent Document

Patent Document 1: WO2017002160

SUMMARY OF THE INVENTION

Problems to be Solved by the Invention

However, as to the lifting and lowering device described in Patent Document 1, structural and operational problems of a construction machine, which are attributable to the long one-stage type ladder, have arisen. For example, when the sidewalk has a height of 4 m, a length of the ladder which is located in an inclined manner when the ladder is extended reaches approximately 5 m. In order to revolve the long ladder, a large load is exerted on the hydraulic cylinder, and because in order to prevent interference thereof upon revolving, a large space is required, a structure of the construction machine is greatly constrained.

In addition, the long ladder which stands upright on the sidewalk in the retracted position hinders a field of view of the operator and causes a center of gravity of the construction machine to be high and thereby makes the construction machine, which sways when traveling on a rough road, unstable, thus leading to a factor of deterioration in workability.

On the other hand, as to the lifting and lowering device which includes the two-stage type ladder, a problem in costs, which is attributable to a structure of the ladder which is foldable, has arisen. In other words, because manufacturing and assembling of components of the four-articulated link mechanism via which the second ladder is revolved in conjunction with the first ladder are cumbersome, manufacturing costs thereof are expensive, and costs for maintenance such as replacement of worn bearings are required. In addition thereto, manufacturing costs of the pair of ladders are expensive, as compared with the one-stage type ladder, and due to these factors, for example, as compared with the lifting and lowering device having the one-stage type ladder, the lifting and lowering device having the two-stage type ladder is disadvantageous in terms of costs. Additionally, the complicated structure of the lifting and lowering device including the two-stage type ladder due to the four-articulated link mechanism has room for improvement also in terms of durability and reliability.

In order to solve the above-mentioned problems, the present invention has been devised. An object of the present invention is to provide a lifting and lowering device for a construction machine, which can be installed without imparting any restrictions in a structure and work to a construction machine and allows costs required for manufacturing and maintenance to be reduced and further, is excellent in durability and reliability.

Means for Solving the Problems

In order to achieve the above-mentioned object, a lifting and lowering device for a construction machine according to the present invention includes: a supporting member being provided in a revolving body of the construction machine; a movable ladder having steps allowing an operator to climb up and down; a trajectory restricting member whose one end is pivotally supported on the supporting member in a swingable manner and whose another end is pivotally supported on the movable ladder in the swingable manner, the trajectory restricting member restricting a movement trajectory of a pivotally supported part at the other end to be of a shape of an arc with a pivotally supported part at the one end as a center; a cooperative rod member whose one end is pivotally supported on the supporting member in the swingable manner and whose another end is pivotally supported in the swingable manner in a position being away from the pivotally supported part of the trajectory restricting member on the movable ladder; and a first hydraulic cylinder whose one end is pivotally supported in the swingable manner in a position being away from a pivotally supported part of the cooperative rod member on the supporting member and whose another end is pivotally supported in the swingable manner in a position in common with a position of the pivotally supported part of the cooperative rod member on the movable ladder, the first hydraulic cylinder supporting the movable ladder together with the trajectory restricting member and the cooperative rod member, the first hydraulic cylinder switching, by moving the pivotally supported part in common with the pivotally supported part of the cooperative rod member in cooperation with the cooperative rod member, a position of the movable ladder between a retracted position in which the movable ladder is retracted to a side of the revolving body and an extended position in which the operator on a ground surface is allowed to climb up and down.

Advantageous Effects of the Invention

A lifting and lowering device for a construction machine according to the present invention switches a position of a movable ladder by causing a cooperative rod member and a first hydraulic cylinder to cooperate with each other and thereby moving pivotally supported parts in common with each other, thus reducing a load exerted on the first hydraulic cylinder, restraining a movement path of the movable ladder in a small area, and lowering a height of the movable ladder in a retracted position. Hence, situations in which a field of view of an operator is hindered and traveling becomes unstable are prevented, and the lifting and lowering device for a construction machine can be installed without imparting any restrictions in a structure and work to a construction machine. Further, since a four-articulated link mechanism having a complicated structure is not needed, the lifting and lowering device for a construction machine allows costs required for manufacturing and maintenance to be reduced and is excellent in durability and reliability.

MODE FOR CARRYING OUT THE INVENTION

Hereinafter, one embodiment in which the present invention is embodied as a lifting and lowering device for a hydraulic excavator as a construction machine will be described.

Figure 1:
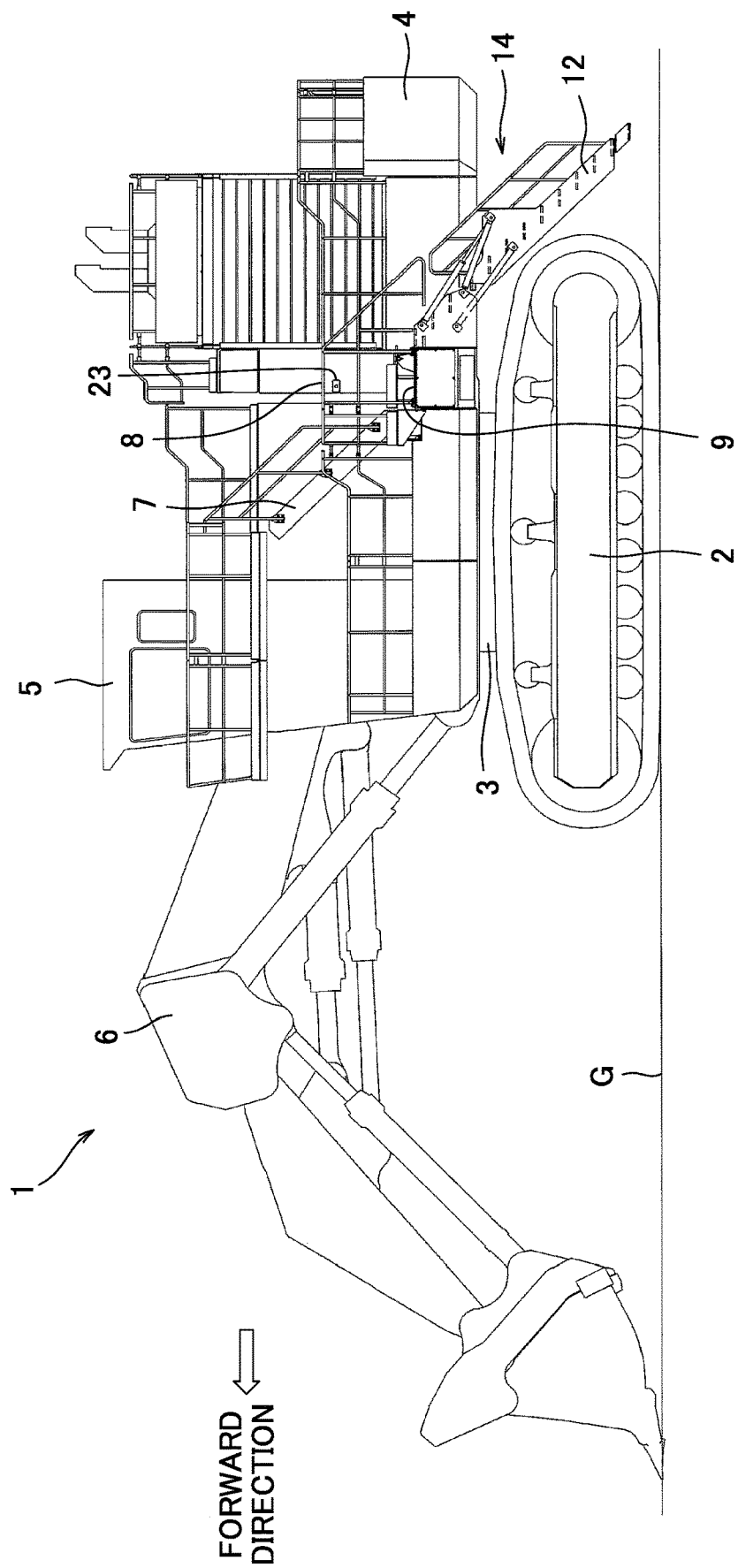
FIG. 1 is a side view illustrating a hydraulic excavator which is equipped with a lifting and lowering device of an embodiment.
Figure 2:
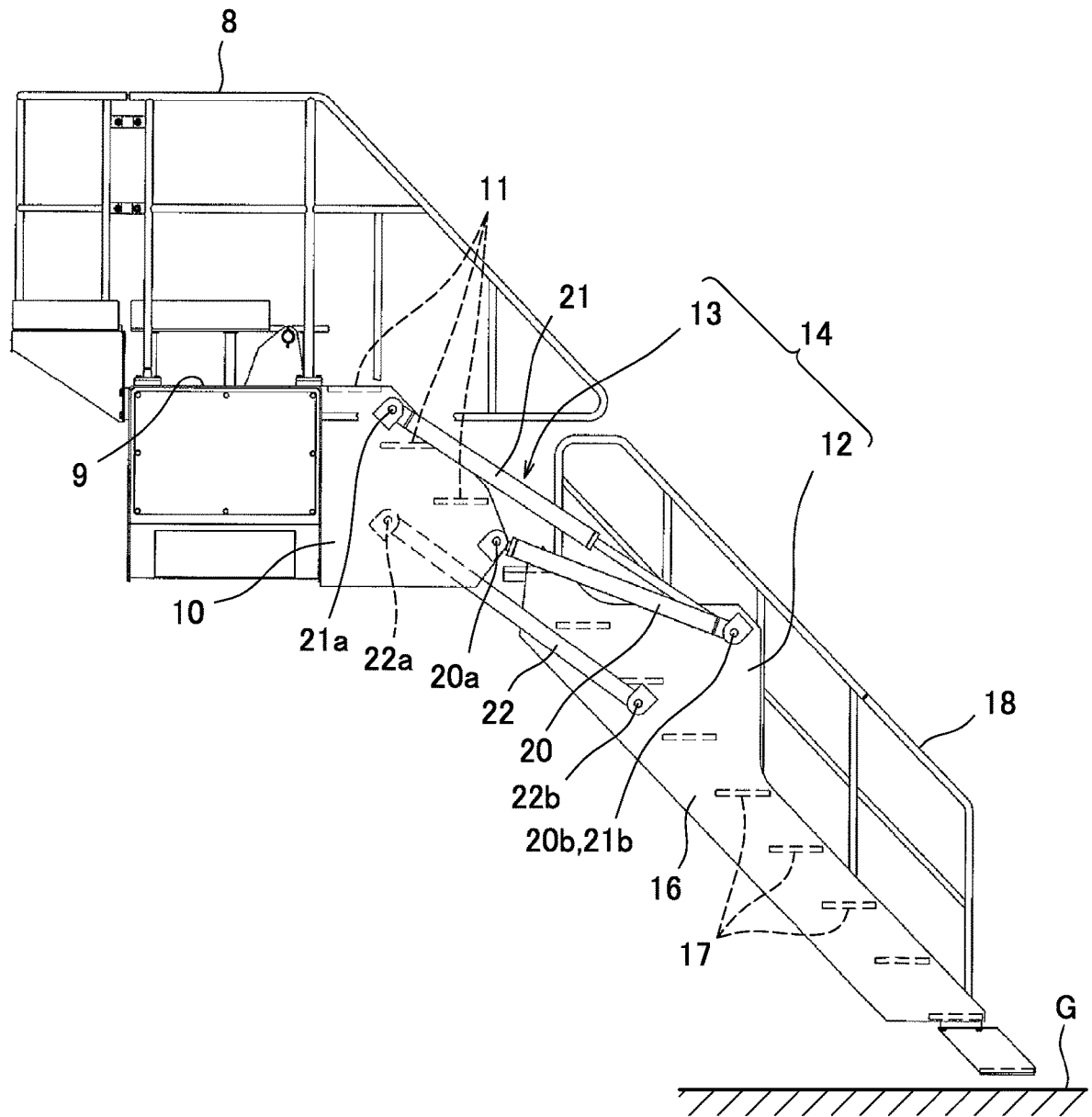
FIG. 2 is a detailed view illustrating the lifting and lowering device in an extended position, corresponding to FIG. 1.

FIG. 1 is a side view illustrating a hydraulic excavator which is equipped with a lifting and lowering device of the present embodiment. FIG. 2 is a detailed view illustrating the lifting and lowering device in an extended position, corresponding to FIG. 1. In the below description, with the hydraulic excavator mainly viewed, a right-left direction in FIG. 1 is referred to as a backward-forward direction, and a direction which is orthogonal to a paper surface is referred to as a right-left direction.

Above a traveling body 2 of a hydraulic excavator 1, a revolving body 4 is attached via a revolving device 3, and on the revolving body 4, a cab 5 is installed, and on a right side of the cab, a multi-articulated front 6 for excavation is attached in such a way as to face forward.

On a rear side of the cab 5 on the revolving body 4, a fixed ladder 7 is provided in such a way as to descend backward. On a lower end of the fixed ladder 7, a sidewalk 9 which includes a handrail 8 is horizontally installed in such a way as to bulge toward a left side from the revolving body 4. On a rear portion of the sidewalk 9, a pair of right and left supporting bases 10, each of which is flat plate-shaped, are fixed, and between the supporting bases 10, three auxiliary steps 11 are provided.

Behind the sidewalk 9, a movable ladder 12 is installed. This movable ladder 12 is supported by lifting and lowering mechanisms 13 provided on the supporting bases 10 of the sidewalk 9, and a position in which the movable ladder 12 is located is switched between a retracted position in which the movable ladder 12 is retracted to a side of the revolving body 4 and an extended position in which an operator can climb up from a ground surface G and climb down to the ground surface G. A lifting and lowering device 14 of the present embodiment is constituted of these movable ladder 12 and the lifting and lowering mechanisms 13.

Figure 3:
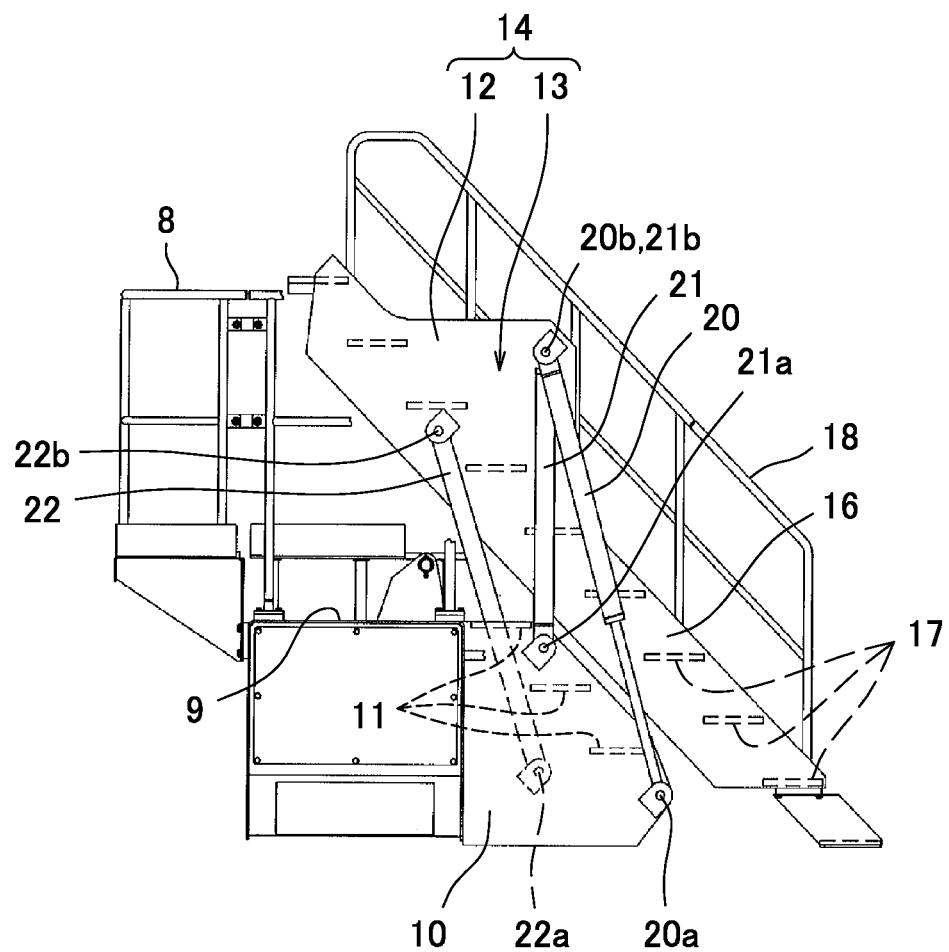
FIG. 3 is a detailed view illustrating the lifting and lowering device in a retracted position.
Figure 4:
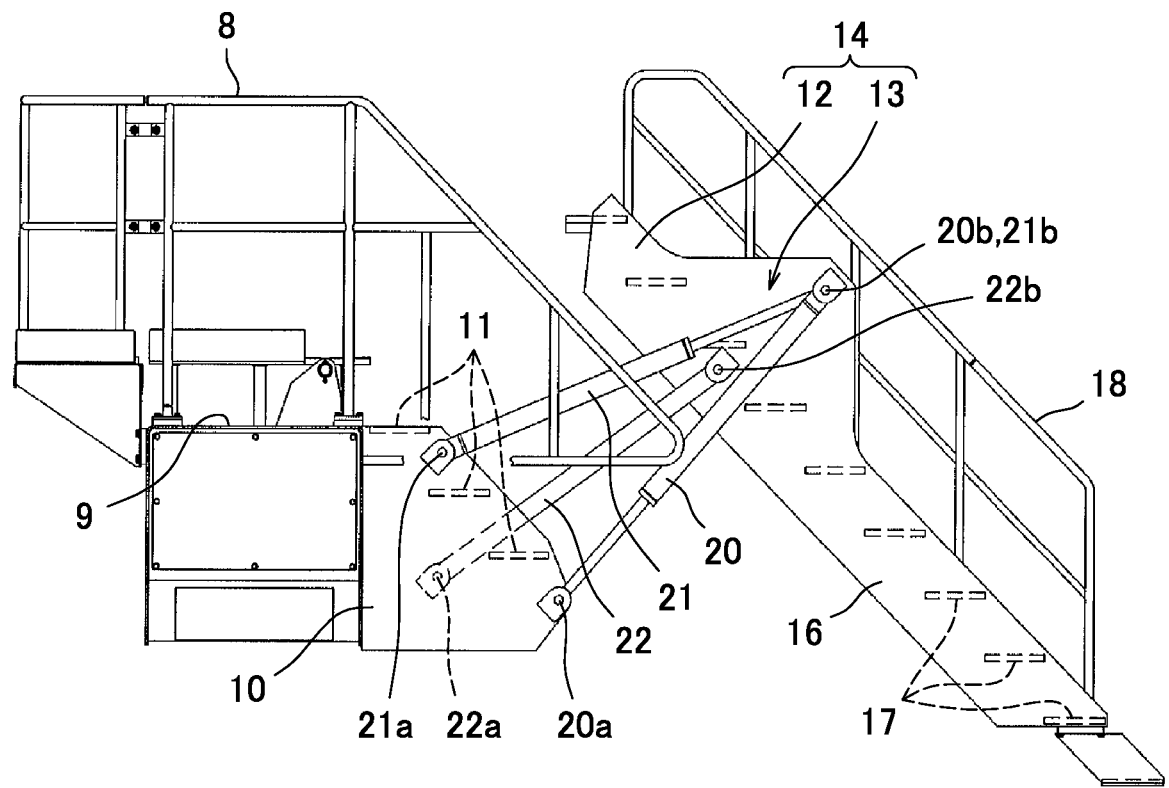
FIG. 4 is a detailed view illustrating the lifting and lowering device in the middle of switching between the extended position and the retracted position.

FIG. 3 is a detailed view illustrating the lifting and lowering device 14 in a retracted position. FIG. 4 is a detailed view illustrating the lifting and lowering device 14 in the middle of switching between an extended position and the retracted position. Hereinafter, with reference to these drawings, a configuration of the movable ladder 12 will be described.

The movable ladder 12 as a whole is configured by connecting a pair of right and left ladder frames 16, each of which is flat plate-shaped, by a multitude of steps 17. The respective steps 17 are provided in such a way as to line up at predetermined intervals in a longitudinal direction of the movable ladder 12. Handrails 18 are fixed to the right and left ladder frames 16, respectively.

In any of the extended position shown in FIG. 2 and the retracted position shown in FIG. 3, the movable ladder 12 is held in a posture in which the movable ladder 12 is inclined backward in a descending direction.

In the extended position, an upper end of the movable ladder 12 is in proximity to the sidewalk 9. An uppermost step 17 is connected to the above-mentioned auxiliary steps 11, whereby a length of the movable ladder 12 is supplemented by the auxiliary steps 11. In addition, a lower end of the movable ladder 12 is located in the vicinity of the ground surface G.

The movable ladder 12 in the retracted position is located above the sidewalk 9 in a posture similar to a posture in which the movable ladder 12 is in the extended position. Therefore, as shown in FIG. 3, a position of the lower end of the movable ladder 12 substantially coincides with a position of a lowermost portion of the sidewalk 9 in a height direction, and the movable ladder 12 is thereby prevented from interfering with the traveling body 2 upon revolving of the revolving body 4.

The lifting and lowering mechanisms 13 are disposed on right and left sides of the sidewalk 9 and the movable ladder 12, respectively. Since the right and left lifting and lowering mechanisms 13 have totally identical configurations, hereinafter, as a representative, the lifting and lowering mechanism on a left side will be described.

The lifting and lowering mechanism 13 is constituted of a pair of first and second hydraulic cylinders 20 and 21, which operate in cooperation with each other, and trajectory restricting members 22. The trajectory restricting members 22 which are rod-shaped connect the sidewalk 9 and the movable ladder 12. Specifically, one ends of the trajectory restricting members 22 are pivotally supported by the supporting base 10 of the sidewalk 9 in a swingable manner (hereinafter, referred to as pivotally supported parts 22a), and other ends of the trajectory restricting members 22 are pivotally supported on a ladder frame 16 of the movable ladder 12 in the swingable manner (hereinafter, referred to as pivotally supported parts 22b). Accordingly, a movement trajectory of the pivotally supported parts 22b at the other ends of the trajectory restricting members 22 is restricted to be of a shape of an arc with the pivotally supported parts 22a at the one ends of the trajectory restricting members 22 on a side of the supporting base 10 as a center, and the movable ladder 12 can also move along an arc-shaped trajectory together with the pivotally supported parts 22b at the other ends thereof.

On the other hand, the first and second hydraulic cylinders 20 and 21 are connected to the sidewalk 9 and the movable ladder 12. Specifically, main body base ends 20a and 21a of the first and second hydraulic cylinders 20 and 21 (which correspond to one end of the present invention) are pivotally supported in the swingable manner in positions on the supporting base 10 of the sidewalk 9 which are apart from each other and which are also away from the pivotally supported parts 22a of the one ends (hereinafter, referred to as pivotally supported parts 20a and pivotally supported parts 21a).

In addition, rod tip ends 20b and 21b of the first and second hydraulic cylinders 20 and 21 (which correspond to another end of the present invention) are pivotally supported in the swingable manner in a common position on the ladder frame 16 of the movable ladder 12 (hereinafter, referred to as in-common pivotally supported parts 20b and 21b). These in-common pivotally supported parts 20b and 21b are away from at a predetermined interval from the pivotally supported parts 22b at the other ends of the trajectory restricting members 22. Note that the main body base ends 20a and 21a and the rod tip ends 20b and 21b of the hydraulic cylinders 20 and 21 may be disposed in a manner opposite to the above-mentioned manner.

As described above, the left side of the movable ladder 12 is supported from a side of the sidewalk 9 at a total of two points of a point of the pivotally supported parts 22b via the trajectory restricting members 22 and a point shared by the in-common pivotally supported parts 20b and 21b via the first and second hydraulic cylinders 20 and 21. In addition, since the lifting and lowering mechanism 13 of the movable ladder 12 on a right side has the identical configuration as mentioned above, as a result, the movable ladder 12 is supported from the side of the sidewalk 9 at a total of four points by the right and left lifting and lowering mechanisms 13. The right and left first second hydraulic cylinders 20 operate in synchronization with each other, whereby while the movable ladder 12 is being prevented from inclining in a right-left direction, the movable ladder 12 is retained in a posture and a position in accordance with operation of the hydraulic cylinders 20 and 21 as described below.

A position of the in-common pivotally supported parts 20b and 21b of the movable ladder 12 is displaced in accordance with a retracting or extending state of rods of the hydraulic cylinders 20 and 21. Specifically, one end of a movement trajectory of the in-common pivotally supported parts 20b and 21b comes to a position when the first hydraulic cylinders 20 shown in FIG. 2 are most contracted (hereinafter, referred to as a contracted position) and comes to a position when the second hydraulic cylinders 21 shown in FIG. 2 are most extended (hereinafter, referred to as an extended position). Conversely, another end of the movement trajectory of the in-common pivotally supported parts 20b and 21b comes to a position when the first hydraulic cylinders 20 shown in FIG. 3 are located in the extended position and when the second hydraulic cylinders 21 shown in FIG. 3 are located in the contracted position.

A trajectory along which the in-common pivotally supported parts 20b and 21b move between one end and the other end of the movement trajectory depends on operation timing of both of the hydraulic cylinders 20 and 21. As described below, in the present embodiment, after completion of operation of one of the hydraulic cylinders 20 and 21, operation of another of the hydraulic cylinders 20 and 21 is started. However, the present invention is not limited thereto, and for example, one of the hydraulic cylinders 20 and 21 and the other of the hydraulic cylinders 20 and 21 may be operated in parallel with each other.

Accordingly, for example, in a side view in FIG. 2, in accordance with the retracting or extending state of the rods of the hydraulic cylinders 20 and 21, the position of the in-common pivotally supported parts 20b and 21b is determined. The pivotally supported parts 22b at the other ends of the trajectory restricting members 22 are invariably retained at the predetermined interval from the in-common pivotally supported parts 20b and 21b, and the movement trajectory of the pivotally supported parts 22b is restricted to be of the arc shape via the trajectory restricting members 22. As a result, in accordance with positional relationship of these two points (the point shared by the pivotally supported parts 20b and 21b and the point of the pivotally supported parts 22b), a posture and a position of the movable ladder 12 is spontaneously determined.

The first and second hydraulic cylinders 20 and 21 are connected with a hydraulic circuit, not shown, and a switching valve of the hydraulic circuit is switched in accordance with operation of a lifting and lowering switch 23 provided in the vicinity of the sidewalk 9, and in accordance therewith, the right and left first and second hydraulic cylinders 20 and 21 operate. Note that the extended position and the contracted position of each of the hydraulic cylinders 20 and 21 are set to be immediately before stroke ends for seal protection. Hereinafter, a specific operation state of the lifting and lowering device 14 will be described.

For example, when an operator climbs up the movable ladder 12 and thereby ascends to the sidewalk 9 with the lifting and lowering device 14 in the extended position shown in FIG. 2 and the lifting and lowering switch 23 is operated to select a retracted direction in order to start work, first, the right and left first hydraulic cylinders 20 are operated in extended directions in synchronization therewith (invariably operated with the same strokes). In accordance with the extension of the first hydraulic cylinders 20, the in-common pivotally supported parts 20b and 21b of the first hydraulic cylinders 20 and the second hydraulic cylinders 21 move substantially upward along a trajectory which approximates an arc.

As described above, the pivotally supported parts 22b at the other ends of the trajectory restricting members 22 are invariably retained at the predetermined interval from the in-common pivotally supported parts 20b and 21b, and the movement trajectory thereof is restricted to be of the arc shape via the trajectory restricting members 22. Therefore, in conjunction with the displacement of the position of the in-common pivotally supported parts 20b and 21b, a position of the pivotally supported parts 22b at the other ends of the trajectory restricting members 22 is invariably settled at one point, and in accordance with the positional relationship of these two points, the posture and the position of the movable ladder 12 are spontaneously determined. As shown in FIG. 4, at a point in time when the right and left first hydraulic cylinders 20 have reached the extended positions, the movable ladder 12 is performing an upward translational motion while substantially retaining a posture in the extended position.

Next, the right and left second hydraulic cylinders 21 are operated in contracted directions in synchronization therewith (invariably operated with the same strokes), and in accordance with the contraction thereof, the in-common pivotally supported parts 20b and 21b of the first hydraulic cylinders 20 and the second hydraulic cylinders 21 move upward and forward along the trajectory which approximates the arc. As shown in FIG. 3, at a point in time when the right and left second hydraulic cylinders 21 have reached the contracted positions, the movable ladder 12 is performing a forward and upward translational motion while substantially retaining a posture in the extended position and reaches the retracted position above the sidewalk 9. Thus, the operator gets in the cab 5 and can start the work by the hydraulic excavator 1.

On the other hand, when the lifting and lowering switch 23 is operated to select an extended direction by the operator in order for the operator to descend from the cab 5 to the ground surface G after finishing the operation, first, the right and left second hydraulic cylinders 21 are operated in the extended direction in synchronization therewith. In accordance with the extension of the second hydraulic cylinders 21, the in-common pivotally supported parts 20b and 21b of the first hydraulic cylinders 20 and the second hydraulic cylinders 21 move backward and downward along the trajectory which approximates the arc. As shown in FIG. 4, at a point in time when the right and left second hydraulic cylinders 21 have reached the extended positions, the movable ladder 12 is performing a backward and downward translational motion while substantially retaining a posture in the retracted position.

Next, the right and left first hydraulic cylinders 20 are operated in contracted directions in synchronization therewith, and in accordance with the contraction thereof, the in-common pivotally supported parts 20b and 21b of the first hydraulic cylinders 20 and the second hydraulic cylinders 21 move downward along the trajectory which approximates the arc. As shown in FIG. 2, at a point in time when the right and left first hydraulic cylinders 20 have reached the contracted positions, the movable ladder 12 is performing a downward translational motion while retaining the posture in the retracted position and reaches the extended position in which a lower end thereof is located in the vicinity of the ground surface G. Thus, the operator climbs down the movable ladder 12 and can descend to the ground surface G and upon starting work the next day, climbs up the movable ladder 12 and can ascend to the sidewalk 9.

As is clear from the above description, the operating principle of the lifting and lowering mechanisms 13 is characterized in that the right and left first and second hydraulic cylinders 20 and 21 which are pivotally supported at the common positions with respect to the movable ladder 12 are operated sequentially (or in parallel with each other) and respective cylinder strokes are converted into lifting and lowering strokes of the movable ladder 12 by mutual cooperation thereof without waste. In any of the lifting and lowering positions of the movable ladder 12 shown in FIGS. 2 to 4, the first and second hydraulic cylinders 20 and 21 are retained in the arrangement substantially in parallel with each other while sharing the pivotally supported parts 20b and 21b, and the trajectory restricting members 22 are also retained in the arrangement substantially in parallel with these hydraulic cylinders 20 and 21.

Therefore, the lifting and lowering strokes of the movable ladder 12 between the extended position and the retracted position are ensured, and at the same time, the right and left lifting and lowering mechanisms 13 are invariably retained in one collective small space of occupancy. Accordingly, not only the lifting and lowering mechanisms 13 are installed between the sidewalk 9 and the movable ladder 12 with no difficulty, but also in any of the extended position and the retracted position, the operator can act on the movable ladder 12 and the sidewalk 9 without being hindered by the lifting and lowering mechanisms 13, thus allowing high functionality of the lifting and lowering device 14 to be realized.

Next, effects obtained by the lifting and lowering device 14 for the hydraulic excavator 1, configured as described above, will be described based on comparison with the conventional lifting and lowering device.

First, because it is required to revolve the long ladder of the lifting and lowering device in Patent Document 1, a large load is exerted on the hydraulic cylinders. In contrast to this, in the lifting and lowering device 14 of the present embodiment, in accordance with the retracting or extending state of the rods of the first and second hydraulic cylinders 20 and 21, the in-common pivotally supported parts 20b and 21b are moved, and the positional relationship thereof with the pivotally supported parts 22b at the other ends of the trajectory restricting members 22 is changed, thereby changing the position of the movable ladder 12. As described above, since the operational principles are radically different from each other, driving forces which are required of the hydraulic cylinders 20 and 21 are remarkably small, as compared with a case in Patent Document 1 in which the long ladder is revolved against a large moment, thus allowing a load exerted on the hydraulic cylinders 20 and 21 to be reduced.

In addition, in the lifting and lowering device in Patent Document 1, in order to prevent interference upon revolving the long ladder, a large space is required. In contrast to this, since the movable ladder 12 of the present embodiment performs the translational motion without substantially changing the posture between the extended position and the retracted position, a movement path is restrained in a minimum area. In addition thereto, the movement path of the movable ladder 12 is in the area from behind the sidewalk 9 (the extended position) up to above the sidewalk 9 (the retracted position), that is, an area in which nothing is originally installed. Thus, the lifting and lowering device 14 of the present embodiment can be installed without exerting any influence on the existing facilities and apparatuses with which the revolving body 4 is provided.

In addition, the long ladder in Patent Document 1 in the retracted position in which the long ladder stands upright hinders a field of view of the operator and causes a center of gravity of the construction machine to be high and thereby makes the construction machine unstable during traveling. In contrast to this, in the retracted position of the movable ladder 12 of the present embodiment, a lower end thereof is located at the lowest height (which substantially coincides the lowermost portion of the sidewalk 9) at which revolving of the revolving body 4 is not hindered. Moreover, since unlike the ladder in Patent Document 1, the movable ladder 12 does not stand upright and retains the inclined posture similar to that in the extended position due to the translational motion, a height of an upper end thereof is remarkably low.

In addition thereto, the auxiliary steps 11 installed on the supporting bases 10 of the sidewalk 9 serve to supplement a length of the movable ladder 12. Thus, an overall length of the movable ladder 12 can be shortened by a path length of the auxiliary steps 11, also thereby greatly contributing to restraining of a height of the movable ladder 12 in the retracted position.

Accordingly, a situation in which the field of view of the operator is hindered is avoided by the movable ladder 12 in the retracted position, and on a left obliquely rear side in particular, the field of view which is remarkably more favorable than that obtained by the lifting and lowering device in Patent Document 1 can be ensured. In addition, the lifting and lowering device 14 does not cause a position of a center of gravity of the hydraulic excavator 1 to be heightened, thus allowing the hydraulic excavator 1 to stably travel on a rough road.

Because of the above-described factors, unlike the lifting and lowering device in Patent Document 1, the lifting and lowering device 14 of the present embodiment can be installed without imparting any restrictions in a structure and work to the hydraulic excavator 1.

On the other hand, as to the lifting and lowering device which includes the conventional foldable two-stage type ladder (hereinafter, referred to as the conventional lifting and lowering device in order to distinguish that in Patent Document 1), manufacturing costs and maintenance costs related to the four-articulated link mechanism, which causes the ladders to operate in conjunction with each other, are required and moreover, manufacturing costs of the pair of ladders are also high. Although the lifting and lowering device 14 of the present embodiment does not require the four-articulated link mechanism having the complicated structure, the number of the hydraulic cylinders 20 and 21 increases. However, as compared with the four-articulated link mechanism which requires manufacturing and assembling of components, not only the hydraulic cylinders 20 and 21 which are ready-made are inexpensive, but also reliability thereof is high, thus allowing manufacturing costs and maintenance costs to be reduced. In addition, as compared with the pair of ladders, manufacturing costs of the single movable ladder 12 are also inexpensive.

Hence, as compared with the conventional lifting and lowering device, the lifting and lowering device 14 of the present embodiment not only allows costs required for manufacturing and maintenance to be considerably reduced but also is remarkably excellent in durability and reliability.

As is seen from the above-described operating principle of the lifting and lowering mechanisms 13, in order to move the in-common pivotally supported parts 20b and 21b of the first and second hydraulic cylinders 20 and 21, it is not necessarily needed to drive both of the hydraulic cylinders 20 and 21 together. Even by driving only any one of the hydraulic cylinders 20 and 21, based on the positional relationship with the pivotally supported parts 22b at the other ends of the trajectory restricting members 22, the position shared by the in-common pivotally supported parts 20b and 21b is spontaneously determined. Therefore, instead of any of the hydraulic cylinders 20 and 21, a retractable rod member can be used, and hereinafter, another example of the first embodiment will be described.

Figure 5:
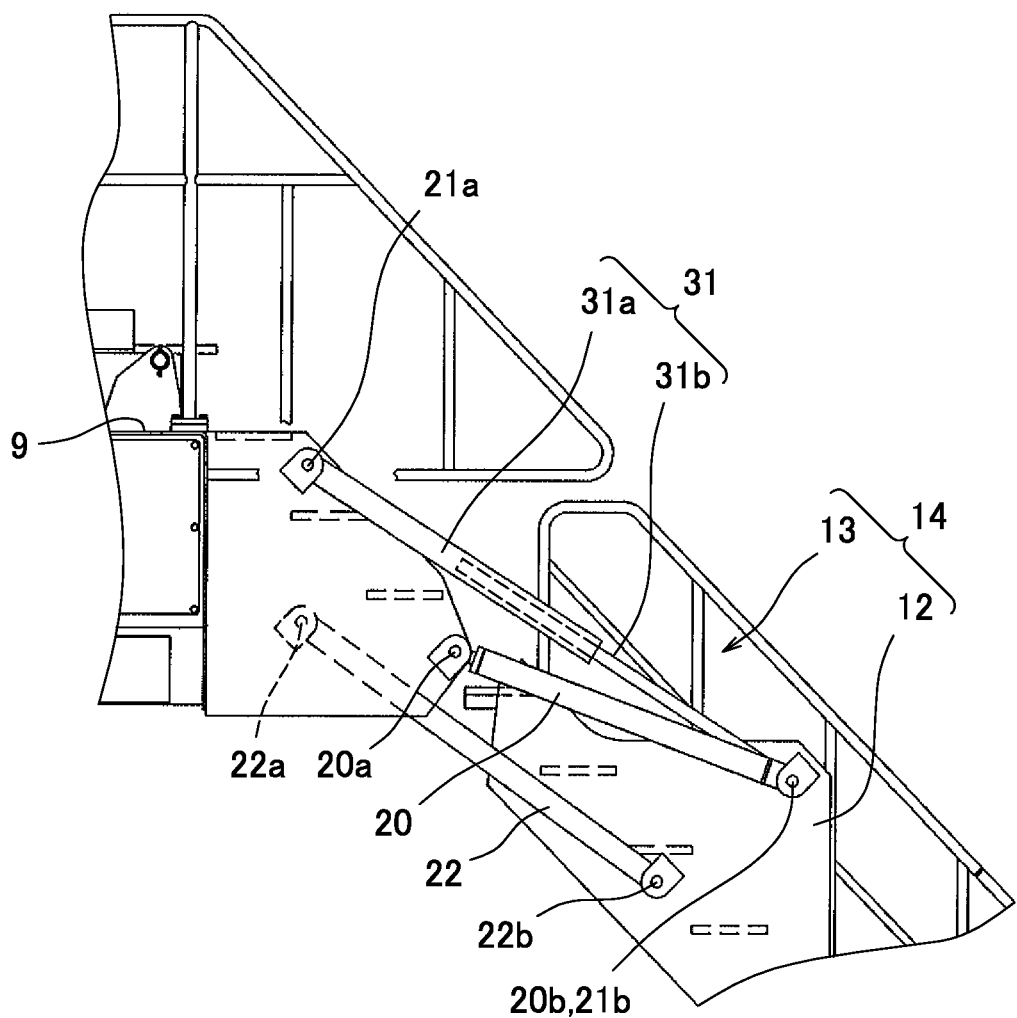
FIG. 5 is a detailed view illustrating a lifting and lowering device of another example of the embodiment in an extended position, corresponding to FIG. 1.

FIG. 5 is a detailed view illustrating a lifting and lowering device 14 of another example in an extended position, corresponding to FIG. 1. In this another example, the second hydraulic cylinders 21 of the embodiment are replaced with retractable rod members 31, and the other components are the same as those in the embodiment. Therefore, the same components are denoted by the same reference signs as those in the embodiment, the description therefor is omitted, and the description will be given by focusing on differences.

The retractable rod members 31 are constituted of outer rods 31a on a side of the sidewalk 9 and inner rods 31b on a side of the movable ladder 12. The inner rods 31b are relatively inserted into the outer rods 31a in a slidable manner, thereby configuring the retractable rod members 31 in a retractable manner.

The lifting and lowering device 14 is driven only by the first hydraulic cylinders 20. With the lifting and lowering device 14 in the extended position shown in FIG. 5, when the first hydraulic cylinders 20 operate in an extended direction, since a movement trajectory of the pivotally supported parts 22b at the other ends of the trajectory restricting members 22 is restricted to be of an arc shape, the retractable rod members 31 operate in a contracted direction in accordance with extension of the first hydraulic cylinders 20. As a result, a position of the lifting and lowering device 14 shifts via the position shown in FIG. 4 as described in the first embodiment to the retracted position shown in FIG. 3.

In addition, with the lifting and lowering device 14 in the retracted position shown in FIG. 4, when the first hydraulic cylinders 20 operate in the contracted direction, the position thereof shifts via a reverse course to the extended position shown in FIG. 5.

Needless to say, instead of the second hydraulic cylinders 21, the first hydraulic cylinders 20 may be replaced with the retractable rod members 31, and also in this case, an operating state is similar to the above-described operating state.

On the other hand, as in the above-described present embodiment, respective settings (the pivotally supported positions, the cylinder strokes, and the like of the hydraulic cylinders 20 and 21 and the trajectory restricting members 22) of the lifting and lowering mechanisms 13 are determined such that the movable ladder 12 is caused to perform the translational motion and can thereby retain the posture in the extended position up to when the movable ladder 12 comes in the retracted position. However, it is not necessarily needed for the movable ladder 12 to retain, also in the retracted position, the posture in the extended position, and as is clear from the operating principle of the lifting and lowering mechanisms 13, in accordance with the respective settings of the lifting and lowering mechanisms 13, a change in the posture of the movable ladder 12 can be modified freely to some extent. Therefore, in the retracted position, the posture of the movable ladder 12 may be changed to be totally different from that in the extended position.

In addition, regardless of whether or not the movable ladder 12 is caused to perform the translational motion, the settings of the pivotally supported positions of the hydraulic cylinders 20 and 21 and the trajectory restricting members 22 are not limited to those in the embodiment. For example, on the supporting base 10 on a left side of the sidewalk 9, one ends 22a of the trajectory restricting members 22 and the main body base ends 21a of the second hydraulic cylinders 21 may be pivotally supported in a common position. Also in this case, the lifting and lowering mechanisms 13 operate without hindrance, and by sharing the pivotally supported positions, the structure is simplified, thus allowing manufacturing costs to be further reduced.

Hereinbefore, the embodiment is described. However, a mode of the present invention is not limited to this embodiment. For example, although in the above-described embodiment, the present invention is embodied as the lifting and lowering device for the hydraulic excavator 1, a construction machine to which the present invention is applied is not limited to this and can be optionally modified.

EXPLANATION OF REFERENCE SIGNS

1 Hydraulic Excavator (Construction Machine)
4 Revolving Body
10 Supporting Bases (Supporting Member)
11 Auxiliary Steps
12 Movable Ladder
17 Steps
20 First Hydraulic Cylinders
21 Second Hydraulic Cylinders (Cooperative Rod Member)
22 Trajectory Restricting Members
31 Retractable Rod Members (Cooperative Rod Member)

The invention claimed is:

1. A lifting and lowering device for a construction machine, the lifting and lowering device comprising:
 a supporting member being provided in a revolving body of the construction machine;
 a movable ladder having steps allowing an operator to climb up and down;
 a trajectory restricting member whose one end is pivotally supported on the supporting member in a swingable manner and whose another end is pivotally supported on the movable ladder in the swingable manner, the trajectory restricting member restricting a movement trajectory of a pivotally supported part at the other end to be of a shape of an arc with a pivotally supported part at the one end as a center;
 a cooperative rod member whose one end is pivotally supported on the supporting member in the swingable manner and whose another end is pivotally supported in the swingable manner in a position being away from the pivotally supported part of the trajectory restricting member on the movable ladder; and
 a first hydraulic cylinder whose one end is pivotally supported in the swingable manner in a position being away from a pivotally supported part of the cooperative rod member on the supporting member and whose another end is pivotally supported in the swingable manner in a position in common with a position of the pivotally supported part of the cooperative rod member on the movable ladder, the first hydraulic cylinder supporting the movable ladder together with the trajectory restricting member and the cooperative rod member, the first hydraulic cylinder switching, by moving the pivotally supported part in common with the pivotally supported part of the cooperative rod member in cooperation with the cooperative rod member, a position of the movable ladder between a retracted position in which the movable ladder is retracted to a side of the revolving body and an extended position in which the operator on a ground surface is allowed to climb up and down.

2. The lifting and lowering device for a construction machine according to claim 1, wherein the cooperative rod member is a second hydraulic cylinder which during switching the position of the movable ladder between the retracted position and the extended position, operates in a direction reverse to a direction in which the first hydraulic cylinder moves.

3. The lifting and lowering device for a construction machine according to claim 1, wherein the cooperative rod member is a retractable rod member which is configured to be retractable.

4. The lifting and lowering device for a construction machine according to claim 1, wherein the movable ladder performs a translational motion while retaining a posture between the extended position and the retracted position.

5. The lifting and lowering device for a construction machine according to claim 1, wherein the supporting member is provided with auxiliary steps being connected to the steps which the movable ladder in the extended position has.

* * * * *